United States Patent [19]
Tomita et al.

[11] Patent Number: 5,159,611
[45] Date of Patent: Oct. 27, 1992

[54] VARIABLE RATE CODER

[75] Inventors: Yoshihiro Tomita, Tokyo; Kohei Iseda, Kawasaki; Shigeyuki Unagami, Atsugi, all of Japan

[73] Assignee: Fujitsu Limited, Kawasaki, Japan

[21] Appl. No.: 860,210

[22] Filed: Mar. 27, 1992

Related U.S. Application Data

[63] Continuation of Ser. No. 412,473, Sep. 26, 1989, abandoned.

[30] Foreign Application Priority Data

Sep. 26, 1988 [JP] Japan ................. 63-238869

[51] Int. Cl.$^5$ ............................... H04B 1/10
[52] U.S. Cl. ........................ 375/34; 380/41; 381/30
[58] Field of Search ............... 375/34, 58, 122, 27; 380/41; 381/29, 30, 31; 358/133, 138; 371/5.5; 455/72

[56] References Cited

U.S. PATENT DOCUMENTS

| | | | |
|---|---|---|---|
| 4,748,625 | 5/1988 | Krause et al. | 375/34 |
| 4,751,736 | 6/1988 | Gupta et al. | 381/31 |
| 4,797,902 | 1/1989 | Nishiguchi et al. | 375/34 |
| 4,922,508 | 5/1990 | Moriya | 358/133 |
| 4,979,188 | 12/1990 | Kotzin et al. | 375/34 |

FOREIGN PATENT DOCUMENTS

| | | |
|---|---|---|
| 0206352 | 12/1986 | European Pat. Off. . |
| 61-198941 | 9/1986 | Japan . |
| 63-15559 | 1/1988 | Japan . |
| 63-19951 | 1/1988 | Japan . |
| 63-59127 | 3/1988 | Japan . |
| 63-240141 | 10/1988 | Japan . |
| 63-289600 | 11/1988 | Japan . |

OTHER PUBLICATIONS

Taniguchi et al., "A High-Efficiency Speech Coding Algorithm Based on ADPCM with Multi-Quantizers," ICASSP 86 Proceedings, vol. 3, Apr. 1986, New York, pp. 1721-1724.

Tomita et al., "An Implementation of a Variable Rate Codec Based on ADPCM with Multi-Quantizers," IEEE Global Telecommunications Conference & Exhibition, vol. 2, Dec. 1988, New York, pp. 1080-1084.

T. Taniguchi et al. "ADPCM with a Multiquantizer for speech Coding", IEEE Journal on Selected Areas in Communications, vol. 6, Feb. 1988, pp. 410-424.

Primary Examiner—Stephen Chin
Attorney, Agent, or Firm—Staas & Halsey

[57] ABSTRACT

A variable rate coder for transforming an input signal into a low bit rate digital signal, comprising: a plurality of coding units each comprising an output quantizer having a different number of output bits, and each independently transforming the input signal into a respective compressed digital signal. A plurality of bit rate determined circuits are provided to determine an output of one of the plurality of coding units as a candidate output of the coder by a respective individual determining method, in which method, the quality of the signal which is regenerated from the output of each coding unit is compared with an individual predetermined quality evaluating standard, and then the candidate output of the coding unit having the smallest number of output bits, among the candidate outputs of coding units satisfying each standard, is determined as the actual output of the coder. One candidate output, among the plurality of the determined candidate outputs and, which is further determined by a most suitable determining method relative to the level of the input signal, thus is selected as the actual output of the coder. Further, when the number of the output bits in each of the coding units can be variably set, the most suitable number of output bits for the actual output of the coder is calculated based on prediction gains of the coding units, a required signal-to-noise ratio of the coder, and an ADC signal-to-noise ratio at the analog to digital converter, and the number of the output bits in each of the coding units is set based on the above calculated value, before the above operation by the bit rate determining circuits.

14 Claims, 5 Drawing Sheets

VARIABLE RATE CODER

This application is a continuation of application Ser. No. 07/412,473, filed Sep. 26, 1989, now abandoned.

BACKGROUND OF THE INVENTION (1) Field of the Invention

The present invention relates to a variable rate coder for transforming an input signal into a low and adaptively variable bit rate digital signal, and, more particularly, to such a coder employing a plurality of coding circuits each comprising an output quantizer having a different output bit rate, and independently transforming the input signal into a compressed digital signal.

Generally, when a voice signal or a picture signal is transmitted, the original input signal is coded at the sender (i.e., transmitting) side by a coding method to reduce the bit rate on the transmission line, and the coded signal is received and decoded to regenerate the original signal in the receiver side.

In the above transmission using coding, in addition to the requirement of a low bit rate, a sufficient quality of the regenerated signal is required according to the purpose of usage.

In particular, in communication systems which allow variations of bit rate, such as a packet communication system, it is desirable to code an input signal to a least bit rate signal which maintains a sufficient quality of the regenerated signal from the view point of efficiency and quality.

(2) Description of the Related Art

One attempt to realize the above-mentioned coding wherein an input signal is coded to a least bit rate signal which maintains a sufficient quality of the regenerated signal, called a variable rate coder, is described by T. Taniguchi, et al. in "ADPCM with a Multiquantizer for Speech Coding", IEEE Journal on Selected Areas in Communications, Vol. 6, Feb. 1988, pp. 410-424.

The coder described in the above paper comprises a plurality of ADPCM coder units, and the number of bits of the quantizer output in each coder unit is different.

Input signals are coded in parallel in the plurality of coder units, the quality of the coding in each coder unit is evaluated for each frame of data, and the coder unit giving a lowest bit rate among the coder units satisfying a predetermined quality requirement is selected to be used for transmission.

To carry out the above evaluation (determination whether or not the output of each coder unit satisfies the above predetermined requirement of quality), two methods are described in the above paper.

In the one method, the signal-to-noise ratio (SNR) value is obtained for each coder unit and each frame of data, and the obtained SNR value is compared with a threshold of the SNR corresponding to the above predetermined quality requirement.

In a coder which performs prediction coding, the difference between an input signal and a prediction value of the input are quantized by the quantizer, and the output of the quantizer is used as the output of the coder. The SNR in the coder is expressed by a multiple (summation when the SNR is expressed as a logarithm) of a prediction gain and a quantization gain when the input signal is large enough to ignore the quantization step size in the analog to digital converter which is provided in the input stage of the coder. Therefore, when the prediction gain is large (the above difference is small), only a small number of the quantization steps in the quantizer (a small number of output bits of the quantizer) is necessary to obtain the required SNR, and when the prediction gain is small (the above difference is large), a large number of the quantization steps in the quantizer (a large number of output bits of the quantizer) is necessary to obtain the required SNR. Thus, the above-mentioned evaluation of the SNR enables control of the output bit rate of the coder.

In the other method, a noise (error) level is used for the evaluation instead of the SNR.

As described in the above paper, there is a problem that a high bit rate output is selected for a low level input signal when evaluation based on the SNR is used, and for a high level input signal when evaluation based on the noise level is used.

Generally, an analog to digital converter is provided in the sampling stage of a coder for converting an analog input signal to a digital signal, where a fixed amplitude range for input signals (dynamic range) is assigned at the input of the analog to digital converter, and the step size (resolution) in the analog to digital converter is constant. The constant step size in the analog to digital converter limits the SNR in the analog to digital converter, and thus the SNR in the total coder output. In particular, when the input level becomes lower, it becomes difficult to obtain the required SNR value.

As mentioned, the above control of the output bit rate of the coder using the SNR evaluation is effective when the input signal is large enough to ignore the quantization step size in the analog to digital converter. However, when an SNR value in the analog to digital converter which is determined by the factor: (input signal level)/(quantization step size in the analog to digital converter), is comparable with the SNR value required for the total coder (i. e., required for a signal regenerated in the receiver side through the coder and a corresponding decoder), the above control of the output bit rate of the coder using the evaluation of SNR is not effective because an increase in the quantization gain in the quantizer can recover only a decrease in the prediction gain, but cannot recover the SNR degraded in the analog to digital converter. Nevertheless, in the conventional variable rate coder, the above control of the output bit rate of the coder using the evaluation of SNR, i. e., an increase in the output bit rate of the coder when the SNR of the coder becomes lower, is carried out even when the SNR of the coder is degraded by the SNR in the analog to digital converter due to a low level input.

In the coder wherein the above control of the output bit rate is carried out based on the noise level instead of the SNR, the aforementioned problem of a high bit rate for a high level input is caused by a constant threshold level for noises which requires a high SNR for a high level input.

Therefore, in the conventional variable rate coders, even if the output bit rate of the coder is controlled based on the SNR or the noise level, there is a problem that a high bit rate, which does not contribute to the quality of the transmitted signal, is output according to the variation of the input level.

Further, in the conventional variable rate coder as described in the aforementioned paper by Taniguchi et al., a plurality of coder units are provided, wherein the number of the coder units is determined by the extent of the variation of the necessary bit rates to obtain a required quality, and an input signal is coded in parallel in all the coding units. Therefore, there is a problem that the scale of the hardware is very large.

SUMMARY OF THE INVENTION

An object of the present invention is to provide a variable rate coder for achieving optimal coding according to a variation of an input level from the viewpoint of quality and bit rate.

Another object of the present invention is to provide a variable rate coder for achieving optimal coding according to a variation of an input level from the viewpoint of quality and bit rate, with a reduced hardware size.

According to the first embodiment of the present invention, there is provided a coder for transforming an input signal into a low bit rate digital signal, and wherein the coder comprises a plurality of coding means, a plurality of candidate output signal determining means, a control determining means, and an output selecting means. The plurality of coding means each comprises an output quantizer having a different number of output bits, and independently transforms the above input signal into a respective, compressed digital signal. The plurality of candidate output signal determining means each determines an output of one of the above plurality of coding means as a candidate output of the (variable rate) coder, (according to the present invention) by an individual, respective determining method, in which method, the quality of a signal which is regenerated from an output of each coding unit is evaluated by an individual and respective predetermined quality evaluating standard, and then the output of the coding means having the smallest number of output bits, among the candidate outputs of the coding means satisfying the respective above standards, is determined as the actual output of the coder. The control determining means selects the aforesaid one of the above output candidate output signal determining means as the means to determine the actual output of the coder, according to the power of the input signal. The output selecting means selects the output of the thus determined one of the plurality of coding means as the actual output of the coder, according to the output of the candidate output signal determining means which is selected by the control determining means.

According to the second embodiment of the present invention, there is provided a coder for transforming an input signal into a low bit rate digital signal, wherein the coder comprises a plurality of coding means, a plurality of decoding means, a plurality of error obtaining means, a plurality of S/N obtaining means, an S/N control candidate output signal determining means, an error level control candidate output signal determining means, a control determining means, and an output selecting means. The plurality of coding means each comprises an output quantizer having a different number of output bits, and independently transforms the above input signal into a respective, compressed digital signal. The plurality of decoding means are provided corresponding to the above plurality of coding means. The plurality of error obtaining means are provided, corresponding to the above plurality of decoding means, and each obtaining an error which is generated through a corresponding coding means and a corresponding decoding means, based on the above input signal and an output of the corresponding decoding means. The plurality of S/N obtaining means are provided corresponding to the above plurality of decoding means, and each obtains a signal-to-noise ratio based on the power of the above input signal and the power of an output of a corresponding error obtaining means. The S/N control candidate output signal determining means determines an output of one of the coding means, among the outputs of the above plurality of coding means, as the candidate output signal of the coder, according to the outputs of the above plurality of S/N obtaining means. The error level control candidate output signal determining means determines an output of one of the coding means, among the outputs of the above plurality of coding means, as the candidate output signal of the coder, based on the outputs of the above plurality of error obtaining means. The control determining means—which determines, as the output of the coder, an output of a coding means determined by the above S/N control output determining means when the power of the input signal is greater than a first predetermined value—determines, as the actual output of the coder, an output of a coding means determined by the above error level control candidate output signal determining means when the power of the input signal is not greater than a second predetermined value, and determines, as the output of the coder, an output of a coding means having a smaller number of output bits between the above output determined by the above S/N control candidate output signal determining means and the above output determined by the above error level control candidate output signal determining means, when the above power of the input signal is between the above first and second predetermined values. The output selecting means determines, as the actual output of the coder, the output of the coding means which is determined by the above control determining means.

According to the third embodiment of the present invention, there is provided a coder for transforming an input signal into a low bit rate digital signal, and wherein the coder comprises a plurality of coding means, a plurality of prediction gain obtaining means, a bit rate calculating means, a bit rate setting means, and an output selecting means. In each of the plurality of coding means a number thereof output bits can be variably set, and each of can carry out predictive coding independently. Each of the plurality of prediction gain obtaining means obtains a prediction gain, in each of the above plurality of coding means. The bit rate calculating means determines a plurality of successive numbers as the above numbers of output bits of the above plurality of coding means, based on a required value of the signal-to-noise ratio of the coder and the above prediction gains in the above plurality of coding means. The bit rate setting means set the above plurality of successive numbers in the above plurality of coding means as the above number of output bits, respectively. The output selecting means select an output of one of the above plurality of coding means, as the output of the above coder, based on a predetermined standard.

DESCRIPTION OF THE PREFERRED EMBODIMENTS

Before describing the preferred embodiment of the present invention, the basic principle of the first aspect of the present invention is explained below.

As described in the summary of the invention, according to the first embodiment of the present invention, an input signal is coded in parallel in the plurality of coding means, and the output of one of the plurality of coding means, which is selected by one of the plurality of output determining means, is used as the output of the (variable rate) coder. The above one of the output determining means is further selected by the control determining means according to the power of the input signal.

Thus, when the characteristic (particularly the applicability or suitability) of the quality control —using the individual predetermined evaluation standard by each of the output determining means—depends on the power of the input signal (or input signal level), the most suitable or applicable one of the quality controls using the individual predetermined evaluation standards by the output determining means is selected by the control determining means according to the power of the input signal (or input signal level).

Figure 1:
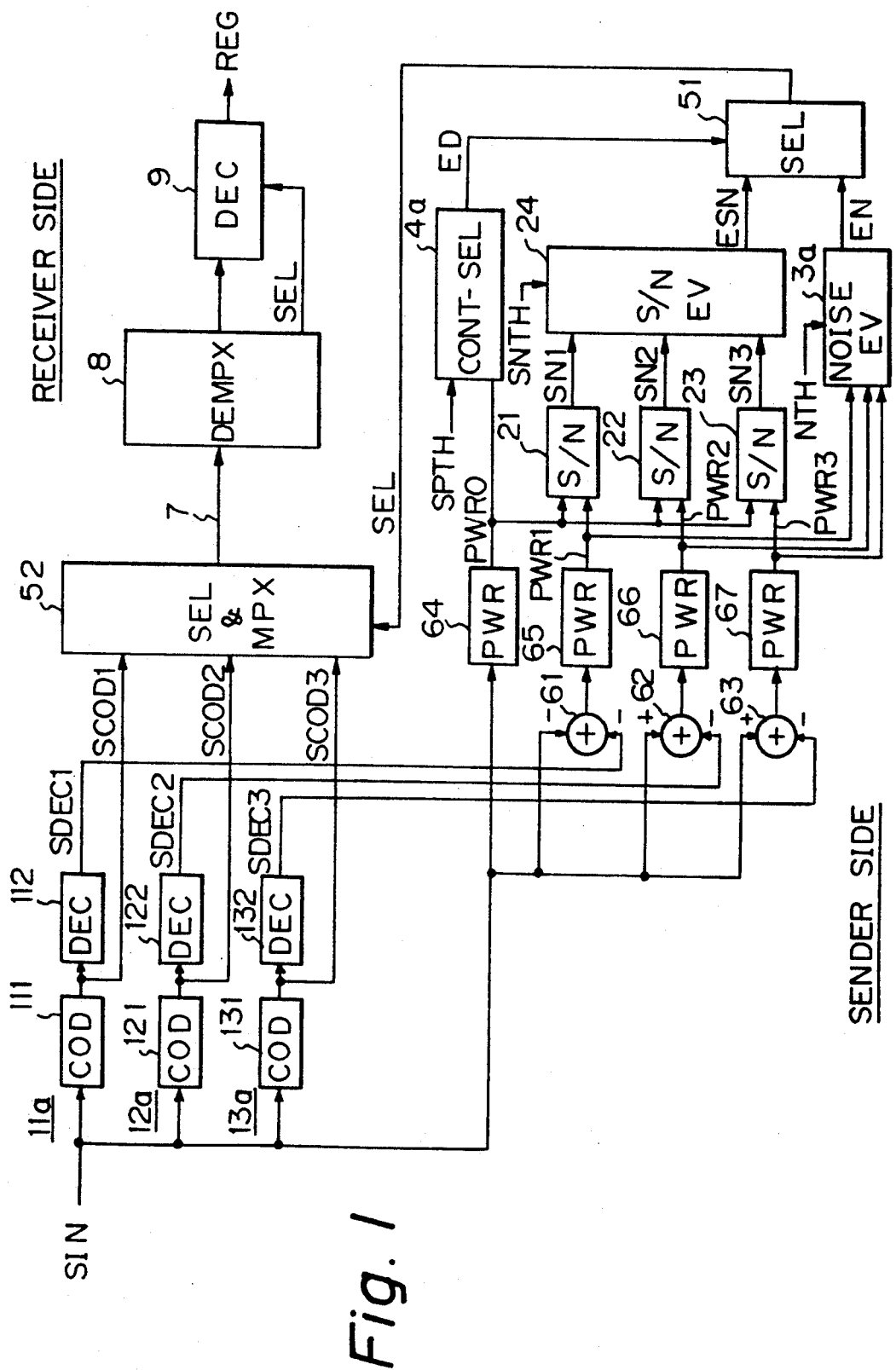
FIG. 1 shows a first embodiment of the present invention.

FIG. 1 shows the first embodiment of the present invention.

In FIG. 1, reference numerals 111, 121, and 131 each denote a coding unit, 112, 122, and 132 each denote a decoding unit, 61, 62, and 63 each denote an adder, 64, 65, 66, and 67 each denote a power calculator, 21, 22, and 23 each denote a divider, 4a denotes a control select circuit, 24 denotes an S/N evaluating control circuit, 3a denotes a noise evaluating control circuit, 51 denotes a selector, 52 denotes a selector and multiplexer, 7 denotes a transmission line, 8 denotes a demultiplexer, and 9 denotes a decoding unit.

Among the above elements, the demultiplexer 8 and decoding unit 9 are included in the receiver side, while all the other elements (except the above elements in the receiver side) and the transmission line 7, constitute a the sender side.

A input signal (denoted by SIN in FIG. 1) is input in parallel into the coding units 111, 121, and 131.

The coding units 111, 121, and 131, which constitute the aforementioned plurality of coding means, have different numbers of output bits (for example, three, four, and five, respectively), and the coding units 111, 121, and 131 in FIG. 1 each carry out, for example, ADPCM coding. The output (coded) signals (each denoted by SCOD1, SCOD2, and SCOD3) from the coders 111, 121, and 131, are input into the selector and multiplexer 52.

The decoding units 112, 122, and 132 respectively decode the output signals (each denoted by SCOD1, SCOD2, and SCOD3) from the corresponding coders, and therefore, each of the decoding units 112, 122, and 132 regenerates the input signal suffering a possible degradation by the coding and decoding through the corresponding coding unit and decoding unit, respectively.

The outputs of the decoding units 112, 122, and 132 (the above-mentioned regenerated signals, respectively denoted by SDEC1, SDEC2, and SDEC3) are subtracted from the real input signal in the adders 61, 62, and 63, respectively, and thus, the error signals which are each generated through the coding units 111, 121, and 131, and the decoding units 112, 122, and 132, respectively, are obtained.

The resultant error signals are input into the power calculators 65, 66, and 67, respectively, and thus, the respective powers (denoted by PWR1, PWR2, and PWR3) of the above error signals are obtained.

On the other hand, the power (denoted by PWR0) of the input signal is calculated in the power calculator 64, and, signal-to-noise ratios (denoted by SN1, SN2, and SN3) for the pairs of the coding units and the corresponding decoding units 111 and 112, 121 and 122, and 131 and 132, are respectively calculated in the dividers 21, 22, and 23.

The above signal-to-noise ratios SN1, SN2, and SN3 from the dividers 21, 22, and 23 are input into the S/N evaluating control circuit 24.

The S/N evaluating control circuit 24 corresponds to one of the aforementioned condidate output signal determining means in the first embodiment of the present invention, and determines the output of one of the coding units 111, 121, and 131, as a condidate output signal of the coder (i.e., a condidate output of the sender side structure as shown in FIG. 1), according to the above signal-to-noise ratios SN1, SN2, and SN3.

In detail, the S/N evaluating control circuit 24 first determines those outputs of the coding units corresponding to the outputs of the dividers which satisfy a predetermined S/N condition, and then determines the output of the coding unit having the smallest number of output bits, among the coding units satisfying the predetermined S/N condition, as a condidate output of the coder.

The above S/N condition is, for example, that the signal-to-noise ratio must be greater than a predetermined threshold. The threshold value (denoted by SNTH in FIG. 1) is predetermined to be, for example, 36 dB.

Thus, if, for example, the signal-to-noise ratios SN2 and SN3 from the dividers 22 and 23 are above 36 dB, and the signal-to-noise ratio SN1 from the divider 21 is below 36 dB, first, it is determined that the coding units 121 and 131 satisfy the above S/N condition, and then the output of the coding unit 121 is determined as a candidate output of the coder because the number of output bits (four) of the coding unit 121 is smaller than the number of output bits (five) of the coding unit 122, at the stage of the S/N evaluating control circuit 24. The result of the determination is output in the form of a selector control signal (denoted by ESN in FIG. 1), and is applied to an input terminal of selector 51.

On the other hand, the powers of the error signals PWR1, PWR2, and PWR3 are input into the noise evaluating control circuit 3a.

The noise evaluating control circuit 3a corresponds to another of the aforementioned candidate output signal determining means in the first embodiment of the present invention, and determines the output of one of the coding units 111, 121, and 131 as a candidate output of the coder (i.e., a candidate for the output of the actual sender side structure as shown in FIG. 1), according to the above powers of the error signals PWR1, PWR2, and PWR3.

In detail, the noise evaluating control circuit 3a first determines the outputs of the coding units corresponding to the outputs of the dividers which satisfy a predetermined error condition, and then determines the output of the coding unit having the smallest number of output bits, among the coding units satisfying the predetermined error condition, as a candidate output of the coder.

The above error condition is, for example, that the power of the error signal must be smaller than a predetermined maximum value. The maximum value (denoted by NTH in FIG. 1) is predetermined to be for example, −75 dBm0.

Thus, if, for example, the powers of the error PWR2 and PWR3 from the power calculators 66 and 67 are below −75 dBm0, and the powers of the error signal PWR1 from the power calculator 65 is over −75 dBm0, first, it is determined that the coding units 121 and 131 satisfy the above error condition, and then the output of the coding unit 121 is determined as a candidate output of the coder because the number of output bits (four) of the coding unit 121 is smaller than the number of output bits (five) of the coding unit 122, at the stage of the noise evaluating control circuit 3a. The result of the determination is output in the form of a selector control signal (denoted by EN in FIG. 1), and is then applied to a corresponding input terminal of selector 51.

The control select circuit 4a corresponds to the aforementioned control determining means in the first embodiment of the present invention, and is implemented by a comparator.

The comparator 4a compares the above-mentioned power PWR0 of the input signal SIN with a threshold level (denoted by SPTH in FIG. 1) of the power of the input signal. The result of the comparison is output in the form of a selector control signal (denoted by ED in FIG. 1), and is then applied to a corresponding control input terminal of selector 51.

The above threshold level of the power of the input signal is set to, for example, −50 dBm0.

Thus, when the power of the input signal is above the above threshold level SPTH, the control output ESN from the S/N evaluating control circuit 24 is selected in the selector 51. The output of the selector 51 (denoted by SEL) is applied to the selector and multiplexer 52 as a control signal for the selector portion of the selector and multiplexer 52. The selector and multiplexer 52 selects one of the output signals from the respective coding units 111, 121, and 131 according to the control signal supplied from the selector 51, and multiplexes the selected output of a coding unit and the above control signal for transmission through the transmission line 7. Thus, the aforementioned control of the output bit rate of the coder using the evaluation of SNR is carried out for selecting a number of output bits in the coder (for selecting a coding unit).

When the power of the input signal is below the above threshold level SPTH, the control output EN from the noise evaluating control circuit 3a is selected in the selector 51. Similar to the above case, the output of the selector 51 (denoted by SEL) is applied to the selector and multiplexer 52 as a control signal for the selector portion of the selector and multiplexer 52. The selector and multiplexer 52 selects one of the output signals from the coding units 111, 121, and 131, according to the control signal supplied from the selector 51, and multiplexes the selected output of a coding unit and the above control signal for transmission through the transmission line 7. Thus, the aforementioned control of the output bit rate of the coder, using the evaluation of noise levels, is carried out for selecting the number of output bits in the coder.

In the above multiplexing operation, coded data can be formed as a packet having a header portion and an information portion. The header portion contains the above control signal SEL, which indicates which one of the outputs of the coding units was selected for the transmission, and the information portion contains, for example, ADPCM codes (the above selected actual output) for 16 data samples.

The decoder 9 of the receiver side, contains the same construction of three decoding units, corresponding to the decoding units 112, 122, and 132 in the sender side, and, when a frame of data is received in the receiver side, the above-mentioned control signal SEL, which is transmitted in the header portion, is divided and is supplied to the decoder 9 to select one of the abovementioned decoding units corresponding to the selection in the sender side. Thus, the regenerated signal (denoted by REG) can be obtained in the receiver side.

In the above embodiment, all the calculations and controls of the respective structures (and thus the switching for the bit rate selection) may be carried out for each frame.

Figure 2:
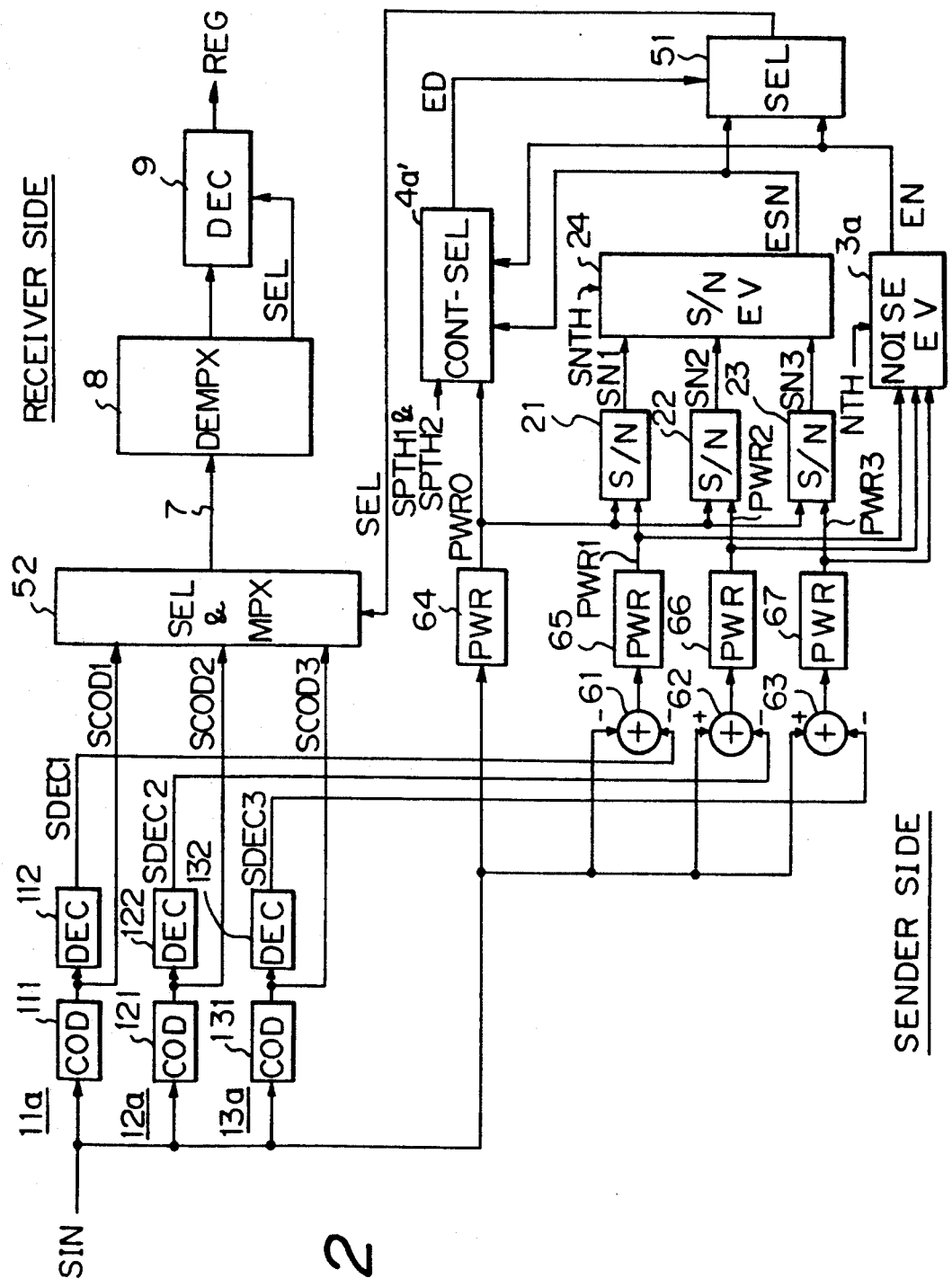
FIG. 2 shows a second embodiment of the present invention.

FIG. 2 shows a second embodiment of the present invention.

The second embodiment of the present invention is a variation of the above first embodiment of the present invention. The only difference between two the embodiments is the function of the control select circuit. In FIG. 2, the control select circuit 4a' receives the control outputs ESN and EN from the S/N evaluating control circuit 24 and the noise evaluating control circuit 3a, and functions as follows.

As described in the summary of the invention, in the second embodiment of the present invention, the range of the power of the input signal is divided into three regions by first and second predetermined threshold values (denoted by SPTH1 and SPTH2 in FIG. 2), and wherein the first predetermined threshold value is greater than the second predetermined threshold value.

The control determining means (which can be implemented by the control select circuit 4a' in FIG. 2) in the second embodiment of the present invention determines as the actual output of the coder, the output of the coding unit determined by the S/N control output determining means (which can be implemented by the S/N evaluating control circuit 24 in FIG. 2) when the power of the input signal is greater than the first predetermined value SPTH1; the above control determining means (the control select circuit 4a' in FIG. 2) further determines, as the output of the coder, the output of a coding unit determined by the above error level control output determining means (which can be realized by the noise evaluating control circuit 3a in FIG. 2) when the power of the input signal is not greater than (i.e., is the same as or less than) the second predetermined value SPTH2: and, further, the above control determining means (the control select circuit 4a' in FIG. 2) determines, as the output of the coder, the output of the coding unit having the smaller number of output bits, as between the output determined by the S/N control output determining means (the control select circuit 4a' in FIG. 2) and the above output determined by the above error level control output determining means (the noise evaluating control circuit 3a in FIG. 2), when the power of the input signal is between the first and second predetermined values SPTH1 and SPTH2.

According to the second embodiment of the present invention, a margin is given for the determination of the threshold level of the power of the input signal. The first and second threshold levels SPTH1 and SPTH2 in the second embodiment of the present invention may be set to ±6 dB of the threshold level in the first embodiment of the present invention.

In the first and second embodiments of the present invention, the numbers of output bits (bit rate) in each of the plurality of coding means (units) in the variable rate coder, are fixed, and therefore, the number of the coder units is determined by the extent of the variation of the necessary bit rates to obtain a required quality, and thus the scale of the hardware is very large.

As described in the summary of the invention, in the third embodiment of the present invention, the number of output bits in each of the plurality of coding units (means) can be variably set, and the numbers of the output bits which are to be set are calculated from a required value of the signal-to-noise ratio of the coder and the prediction gains in the plurality of coding units. In the third embodiment of the present invention, each of the coding units is assumed to carry out predictive coding). The calculated numbers of output bits are preset in the coding units before carrying out the aforementioned operations as performed by the first and second embodiment of the present invention.

Figure 3:
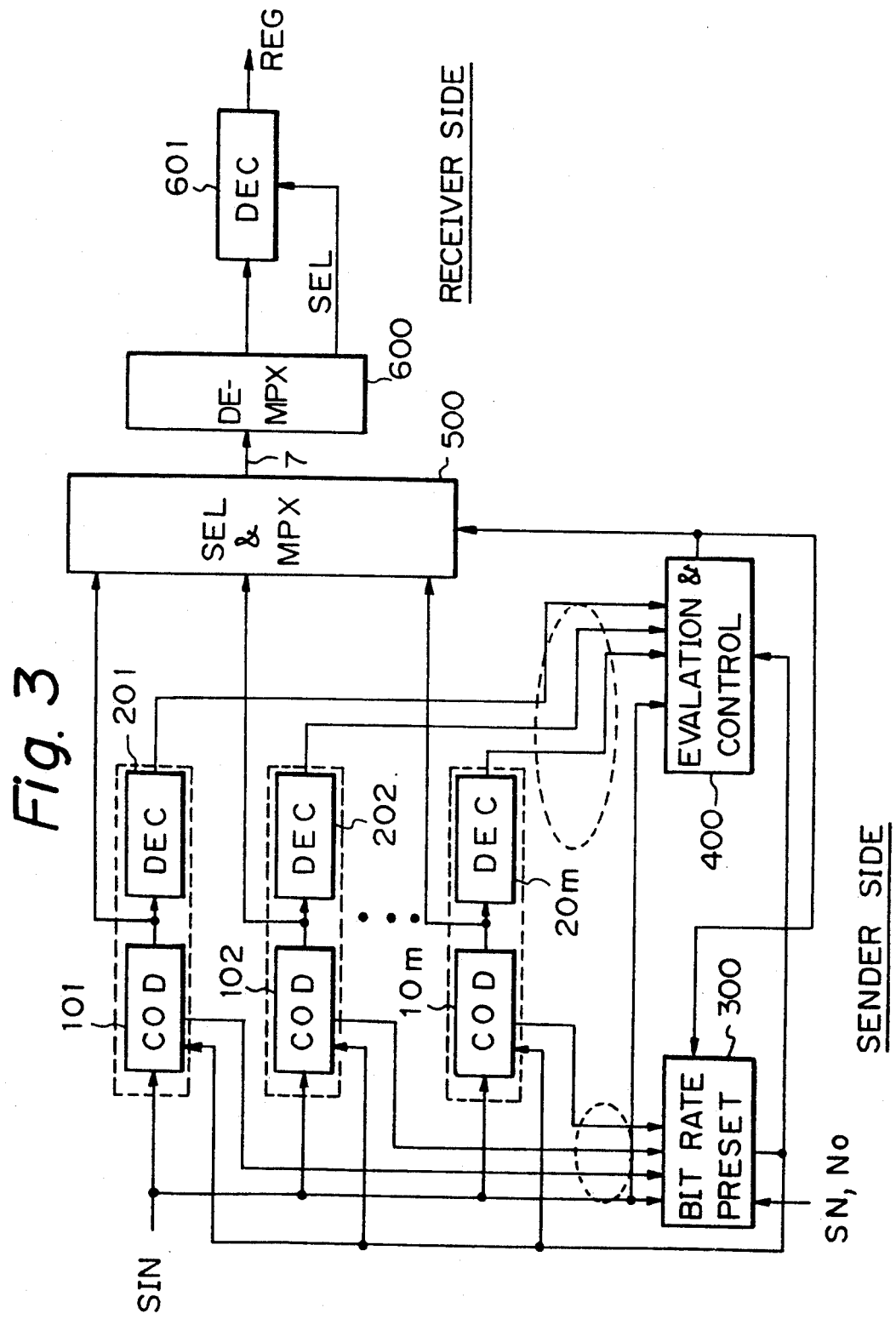
FIG. 3 shows a third embodiment of the present invention.

FIG. 3 shows a third embodiment of the present invention.

In FIG. 3, basic functions of a plurality of coding units 101 to 10m, a plurality of decoding units 201 to 20m, a selector and multiplexer 500, a transmission line 7, a demultiplexer 600, and a decoder 601, are the same as the corresponding constituent elements in the structure of FIGS. 1 or 2, except that the numbers of output bits in the plurality of coding units can be variably set, and each of the coding units carries out predictive coding.

In addition, the evaluation and control circuit 400 shown in FIG. 3 corresponds to the structure of the adders 61, 62, and 63, the power calculators 64, 65, 66, and 67, the dividers 21, 22, and 23, the control select circuit 4a or 4a', the S/N evaluating control circuit 24, the noise evaluating control circuit 3a, and the selector 51 shown in FIGS. 1 or 2. As the characteristics of the third embodiment of the present invention relate to the presetting of the number of output bits in the coding units 101 to 10m and the corresponding decoding units 201 to 20m, the evaluation and control circuit 400 can be of either structure as shown in FIGS. 1 or 2.

The bit rate preset circuit 300 shown in FIG. 3 obtains a plurality of successive numbers for presetting the numbers of output bits of the plurality of coding units, by a calculation using a required value of the signal-to-noise ratio (denoted by SN in FIG. 3) of the coder, a resolution (denoted by $N_o$ in FIG. 3) of an analog to digital converter which is used for sampling the analog input signal, and prediction gains supplied from the coding units 101 to 10 m.

The calculation carried out in the bit rate preset circuit 300 is as follows.

First, the center value i of the above plurality of successive numbers is calculated according to the equations, $i=(SN-PG+10.8-20 \log_{10}AR)/6$ when $SN \leq SNI$, and $i=(SNI-PG+10.8-20 \log_{10}AR)/6$ when $SN \geq SNI$, where SN is the required value of the signal-to-noise ratio of the coder, AR is an input amplitude range expressed by a root mean square of the input signal, PG is a prediction gain in a coding unit, which is defined as $PG=10 \log_{10}(S/E)$, SNI is an ADC signal-to-noise ratio in the above-mentioned analog to digital converter, which is defined as $SNI=10 \log_{10}(S/N_0)$, S is the power of the input signal, and E is a prediction gain in a coding unit.

The above equation $i=(SN-PG+10.8-20 \log_{10}AR)/6$ when $SN \leq SNI$, is deduced from the fact that a summation of a prediction gain (logarithm) and a quantization gain (logarithm) contributes to the total signal-to-noise ratio, and from the well-known relation between the SNR and the number of output bits in a quantizer (for example, in N. S. Jayant, "Digital Coding of Speech Waveforms: PCM, DPCM, and DM Quantizers," Proceedings of the IEEE, Vol. 62, No. 5, pp. 611-, May 1974).

Since, when $SN \geq SNI$, the signal-to-noise ratio in the analog to digital converter governs the total signal-to-noise ratio in the coder, SNI instead of SN is used in the above equation $i=(SNI-PG+10.8-20 \log_{10}AR)/6$.

Next, the plurality of successive numbers $i-k$ to $i+k$ are determined as the successive $2k+1$ numbers having the above-obtained value i as the center value, where the value k is an integer, which is determined by the limitation on the hardware size, i.e., the limitation is determined by the maximum number of the coding units which can operate concurrently. For example, when $i=3$ and $k=1$, the plurality of successive numbers $i-k$ to $i+k$ are 2, 3, and 4.

Figure 4:
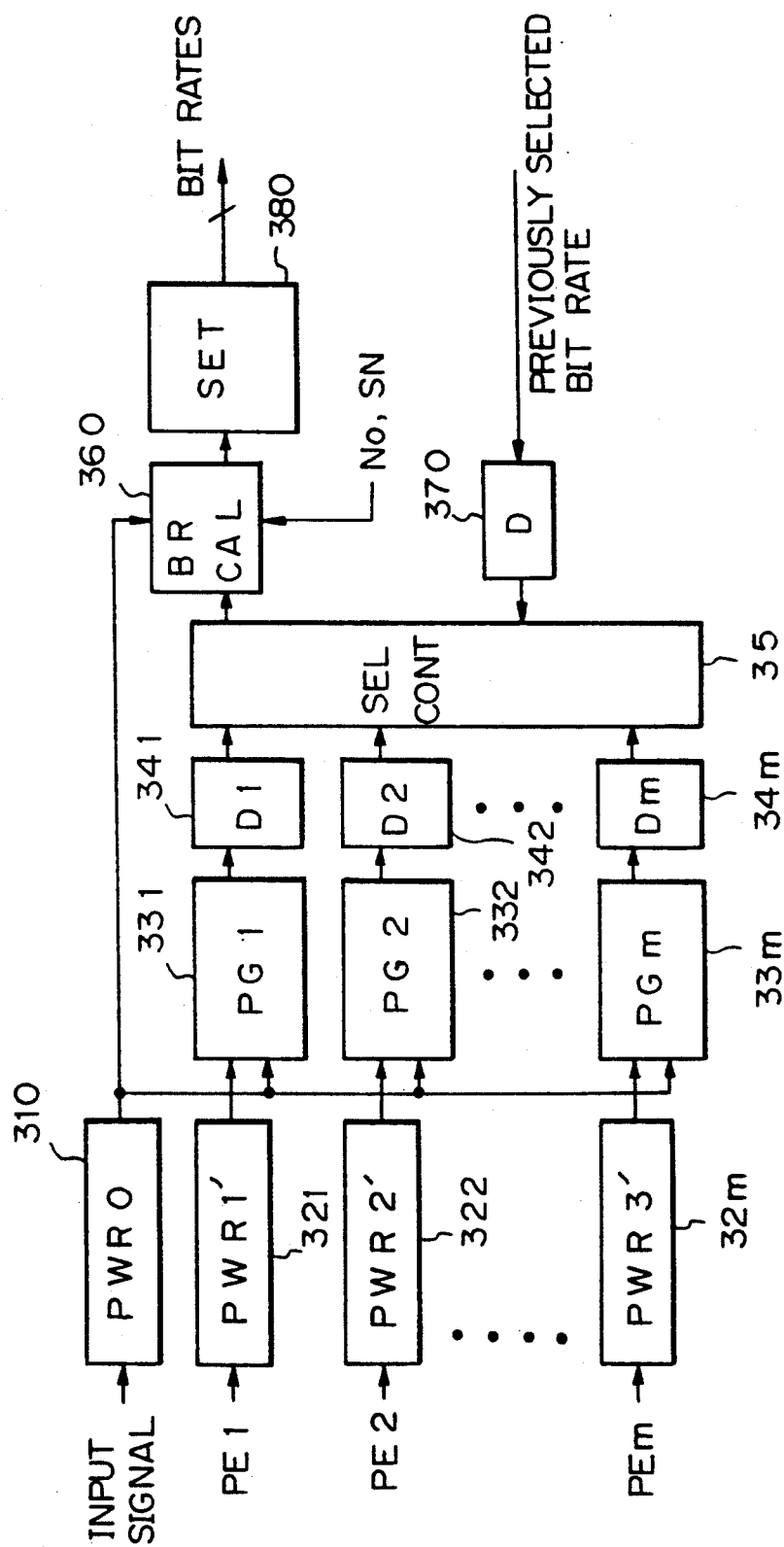
FIG. 4 shows the construction of the bit rate presetting circuit.

FIG. 4 shows a more detailed structure of the bit rate preset circuit 300 in FIG. 3.

In FIG. 4, reference numerals 310, 320 to 32m each denote a power calculator, 331 to 33m each denote a prediction gain calculating circuit, 341 to 34m, and 370 each denote a delay circuit, 360 denotes a bit rate calculating circuit, and 380 denotes a bit rate setting circuit.

The power calculator 310 calculates the power S of the input signal, and each of the power calculators 321 to 32m calculates the power E of a prediction error which is supplied from a corresponding coding unit as explained later.

The prediction gain calculating circuits 331 to 33m each calculate a prediction gain PG from the power S of the input signal and the corresponding prediction error E, as $PG=S/E$.

The calculations and presetting of the bit rates by the bit rate presetting circuit 300 are carried out for each frame of data. The prediction gains PG in the coding units are held in corresponding delay circuits 341 to 34m until the timing of a next frame change.

On the other hand, previously selected bit rates in the coding units 101 to 10m are held in the delay circuit 370.

At the timing of the frame change, the select control circuit 35 inputs all the values held in the delay circuits 331 to 33m, and 370, and then supplies them to the bit rate calculating circuit 360. The abovementioned calculations to obtain the number of output bits (bit rate) in the coding units are carried out in the bit rate calculating circuit 360. Thus, the obtained values are preset in the corresponding coding units. In addition, the output of the bit rate calculating circuit 360 is also supplied to the evaluation control circuit 400, the information on the numbers of output bits is then supplied to the selector and multiplexer 52, and is multiplexed with the selected output of a coding unit for transmission through the transmission line 7.

Figure 5:
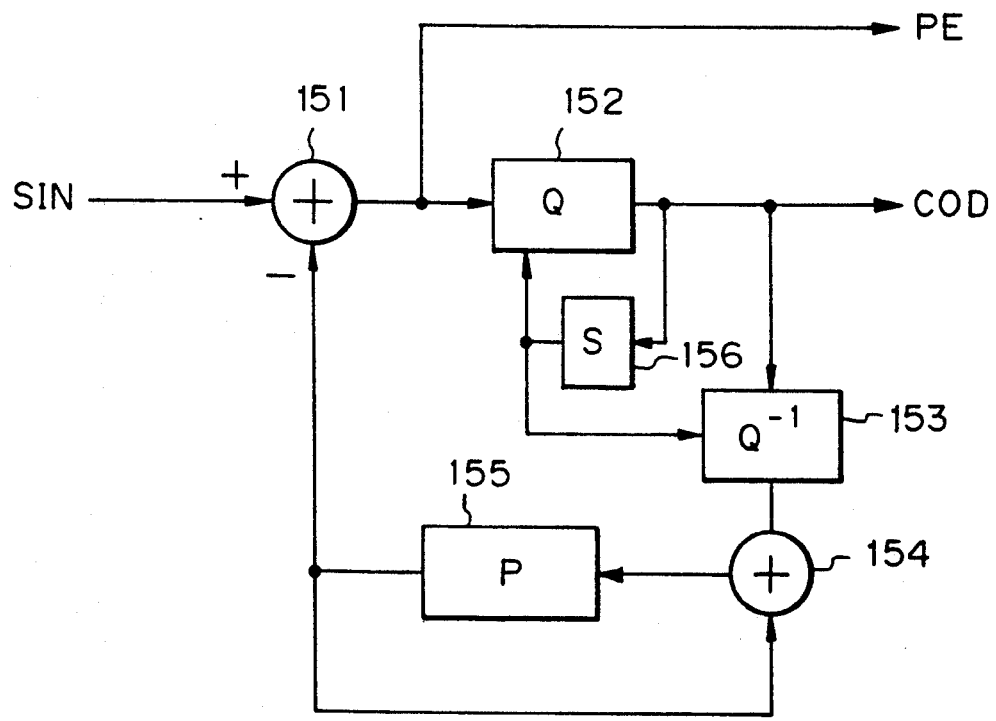
FIG. 5 shows the construction of the coder.

FIG. 5 shows the structure of a coding unit.

In FIG. 5, reference numerals 151 and 154 each denote an adder, 152 denotes a quantizer, 153 denotes an inverse quantizer, 155 denotes an adaptive predictor, and 156 denotes a scale factor register.

In the construction of FIG. 5, in the adder 151, a difference between an input signal SIN and an output of the predictor 155 is obtained, and the output of the adder 151 (prediction error PE) is quantized in the quantizer 152 to a preset bit rate for being transmitted as a coded signal COD. The prediction error PE is sent to a corresponding power calculator shown in FIG. 4.

The output COD of the quantizer 152 is also supplied to the inverse quantizer 153 to be inverse-quantized, and the output of the inverse quantizer 153 is added to the output of the predictor 155 at the adder 154. The output of the adder 154 is supplied to the predictor 155 to generate a next prediction data.

The variable setting of the number of output bits is carried out by changing a transformation table in the quantizer 152 and the corresponding inverse quantizer 153 (the transformation table determines the input-output relationship in the quantizer 152 and the corresponding inverse quantizer 153).

Since the structures of all the above embodiments are implemented by digital signal processors, the above transformation tables for predetermined numbers of output bits (numbers of quantization steps) are installed in advance for each quantizer and a corresponding inverse quantizer. Thus, one of the transformation tables is selected by the output of the scale factor register 156. The content of the scale factor register 156 is renewed by the output of the aforementioned bit rate presetting circuit 300.

As explained above, according to the variable rate coder of the present invention, the most suitable bit rate control is selected, corresponding to variations of the input level (power), and the first and second embodiments of the present invention are applicable to all types of coders. Further, according to the third embodiments of the present invention, the numbers of output bits in the plurality of coding units are adaptively preset according to the prediction gains in the coding units, the power of the input signal, the resolution of the analog to digital converter, and a required SNR level. Thus, only a relatively small number of coding units is necessary compared with the possible extent of the numbers of output bits of coding units. The third embodiment of the present invention is applicable to all types of predictive coders wherein the number of output bits is variable.

We claim:

1. A coder for transforming an input signal into a low bit rate digital output signal comprising:

a plurality of coding means, including respective output quantizers, for independently receiving and transforming the input signal into respective, compressed digital output signals having respective different numbers of output bits as defined by the respective output quantizers thereof;

a plurality of candidate output signal determining means having respective, different and unique quality evaluating standards, each said candidate output signal determining means receiving the respective digital output signals of said plurality of coding means and determining, in accordance with the respective and unique quality evaluating standard thereof, which of the plurality of received digital output signals satisfy the respective and unique quality evaluating standard thereof and then, for the digital output signals which satisfy the evaluating standard, determining which thereof has the smallest number of output bits, and producing a candidate output signal control output identifying the respective coding means for the thus determined digital output signal and thereby designating the digital output signal thereof as a candidate output signal of the coder system, said plurality of candidate output signal determining means thus providing a corresponding plurality of candidate output signal control outputs each designating a candidate output signal and the respective coding means;

power detecting means for detecting, and thereby obtaining a value representing, the power level of said input signal to the coder and for producing a corresponding power level control output;

control determining means for receiving the plurality of candidate output signal control outputs of said respective plurality of candidate output signal determining means and responsive to the power level control output of said power detecting means for selecting one of the plurality of candidate output signal control outputs and producing a corresponding coding means selection control output which designates the thus selected coding mean corresponding to the selected candidate output signal; and output selecting means responsive to the coding means selection control output for selecting the thus selected candidate output signal of the thereby designated and respectively associated coding means as the actual, low bit rate digital output signal of the coder system.

2. A coder for transforming an input signal into a low bit rate digital signal, comprising:

a plurality of coding means, each comprising an output quantizer and said plurality thereof having respective, different numbers of output bits, for independently transforming said input signal into respective, compressed digital output signals;

a plurality of decoding means, corresponding to and respectively associated with said plurality of coding means, for receiving the respective compressed digital output signals thereof and producing corresponding decoded output signals;

a plurality of error obtaining means corresponding to and respectively associated with said plurality of decoding means, each thereof for obtaining an error, generated through the corresponding coding means and the corresponding decoding means, by comparing said input signal and the respective decoded output signals of the corresponding decoding means and producing corresponding error output signals;

a plurality of S/N obtaining means, corresponding to and respectively associated with said plurality of decoding means, each thereof for obtaining a signal-to-noise ratio by comparing the power level of said input signal and the corresponding power levels of the respective outputs of the plurality of corresponding error obtaining means and producing corresponding S/N ratio output signals;

S/N control candidate output signal determining means for determining the output of a specific said coding means, among said plurality of coding means, as a candidate output signal of said coder, in accordance with the respective S/N ratio output signals of said plurality of S/N obtaining means and producing a corresponding S/N ratio selector control output signal;

error level control candidate output signal determining means for determining the output of a specific said coding means, among the outputs of said plurality of coding means, as a candidate output signal of said coder, in accordance with the respective error output signals of said plurality of error obtaining means and producing a corresponding error-based selector control output signal;

control determining means for selecting one of said S/N control candidate output signal determining means and said error level control candidate output signal determining means as the means to determine the actual output of the coder, in accordance with the power level of said input signal; and output selecting means for selecting the output of a specific one of said plurality of coding means as the actual output of the coder in response to the respective selector control output signal of said selected one of said S/N control candidate output signal determining means and said error level control candidate output signal determining means.

3. A coder according to claim 2, wherein said control determining means selects said S/N control candidate output signal determining means as the means to determine said actual output of the coder when said power level of the input signal is greater than a predetermined value, and said control determining means selects said error level control candidate output signal determining means as the means to determine said actual output of the coder when the power of the input signal is not greater than said predetermined value.

4. A coder according to claim 3, wherein said S/N control candidate output signal determining means first determines the outputs of the coding means for which the corresponding outputs of the S/N obtaining means satisfy a predetermined S/N condition, and then determines, from among said coding means satisfying said predetermined S/N condition, the output of the coding means having the smallest number of output bits as said candidate output signal of the coder.

5. A coder according to claim 4, wherein said predetermined S/N condition is that the signal-to-noise ratio of the coding means output is greater than a predetermined threshold value.

6. A coder according to claim 3, wherein said error level control candidate output signal determining means first determines the outputs of the coding means for which the corresponding outputs of the error obtaining means satisfy a predetermined error condition when the coder means outputs are each decoded through the corresponding decoding means and the corresponding errors are each obtained in said error obtaining means, and then determines, from among the outputs of said coding means satisfying the predetermined error condition, the output of the coding means having the smallest number of output bits, as said candidate output signal of the coder.

7. A coder according to claim 6, wherein said predetermined error condition for an error is that the error is not to be greater than a predetermined maximum.

8. A coder for transforming an input signal into a low bit rate digital signal, comprising:

a plurality of coding means, each comprising an output quantizer having a different number of output bits, for independently transforming said input signal into respective, compressed digital signals;

a plurality of decoding means corresponding to and respectively associated with said plurality of coding means, for receiving the respective compressed digital output signals thereof and producing corresponding decoded output signals;

a plurality of error obtaining means corresponding to and respectively associated with said plurality of decoding means, each thereof for obtaining an error, generated through the corresponding coding means and the corresponding decoding means, by comparing said input signal and the respective, decoded output signals of the corresponding decoding means and producing corresponding error output signals;

a plurality of S/N obtaining means, corresponding to and respectively associated with said plurality of decoding means, each thereof for obtaining a signal-to-noise ratio by comparing the power level of said input signal and the power levels of the respective outputs of the plurality of corresponding error obtaining means and producing corresponding signal-to-noise ratio output signals;

S/N control candidate output signal determining means for determining the output of a specific said coding means, among said plurality of coding means, as a candidate output signal of said coder, in accordance with the respective signal-to-noise ratio output signals of said plurality of S/N obtaining means and producing a corresponding signal-to-noise ratio selector control output signal;

error level control output candidate determining means for determining the output of a specific said coding means, among the outputs of said plurality of coding means, as a candidate output signal of said coder, in accordance with the respective error signal outputs of said plurality of error obtaining means and producing a corresponding error-based selector control output signal;

means for defining a first power level threshold value and a second power level threshold value which is less than the first threshold value;

control determining means for determining, as the actual output of the coder, the output of the coding means which is determined by said S/N control candidate output signal determining means when said power level of the input signal is greater than the first power level threshold value, for determining, as the actual output of the coder, the output of the coding means which is determined by said error level control output determining means when the power level of the input signal is not greater than the second power level threshold value, and for determining, as the actual output of the coder, the candidate output signal of the coding means having a smaller number of output bits, as between said candidate output signal determined by said S/N control candidate output signal determining means and said candidate output signal determined by said error level control candidate output signal determining means, when said power level of the input signal is between said first and second power level threshold values; and an output selecting means for determining, as the actual output of the coder, the output of the coding means determined by said control determining means.

9. A coder for transforming an input signal into a low bit rate digital signal, comprising:

a plurality of coding means in each of which a number of output bits can be variably set, and each of which can carry out a predictive coding independently;

a plurality of prediction gain obtaining means each for obtaining a prediction gain in each of said plurality of coding means;

an bit rate calculating means for determining a plurality of successive numbers as said numbers of output bits of said plurality of coding means, based on a required value of the signal-to-noise ratio of the coder and said prediction gains in said plurality of coding means;

a bit rate setting means for setting said plurality of successive numbers in said plurality of coding means as said number of output bits, respectively; and an output selecting means for selecting an output of one of said plurality of coding means, as the output of said coder, based on a predetermined standard.

10. A coder according to claim 9, further comprising:

a plurality of decoding means being provided corresponding to said plurality of coding means;

a plurality of error obtaining means being provided corresponding to said plurality of decoding means, and each obtaining an error which is generated through a corresponding coding means and a corresponding decoding means, based on said input signal and an output of a corresponding decoding means; and a plurality of S/N obtaining means being provided corresponding to said plurality of decoding means, and each obtaining a signal-to-noise ratio, based on the power of said input signal and the power of an output of a corresponding error obtaining means;

wherein said predetermined standard comprises a first requirement that a signal-to-noise ratio in the construction through a coding means and a corresponding decoding means is not to be smaller than a predetermined threshold, and a second requirement that an output having a smallest number of output bits is to be selected among the outputs of the coding means satisfying said first requirement.

11. A coder for transforming an analog input signal into a low bit rate digital signal, comprising:

an analog to digital converter provided in an input stage, and converting said analog input signal to a digital signal;

a plurality of coding means in each of which a number of output bits can be variably set, and each of which can carry out a predictive coding independently;

a plurality of prediction gain obtaining means each for obtaining a prediction gain in each of said plurality of coding means;

a bit rate calculating means for determining a plurality of successive numbers as said numbers of output bits of said plurality of coding means, based on a required value of the signal-to-noise ratio of the coder, an ADC signal-to-noise ratio determined by an input amplitude range and resolution in said analog to digital converter, and said prediction gains in the plurality of coding means;

a bit rate setting means for setting said plurality of successive numbers in said plurality of coding means as the number of output bits, respectively; and an output selecting means for selecting an output of one of said plurality of coding means as the output of said coder, based on a predetermined standard.

12. A coder according to claim 11, wherein said plurality of successive numbers are determined as outputs of $2k+1$ coding means having number of output bits $i-k$ to $i+k$ with a center value of the number of output bits i, where the number i is determined by the equations, $i=(S/N-PG+10.8-20 \log_{10}AR)/6$ when $S/N \leq SNI$, and $i=(SNI-PG+10.8-20 \log_{10}AR)/6$ when $S/N \geq SNI$, S/N is said required value of the signal-to-noise ratio of the coder, SNI is said ADC signal-to-noise ratio in said analog to digital converter, PG is said prediction gain in each coding means, and AR is said input amplitude range expressed by a root mean square of the input signal level.

13. A coder according to claim 12, further comprising:

a plurality of decoding means being provided corresponding to said plurality of coding means;

a plurality of error obtaining means being provided corresponding to said plurality of decoding means, and each obtaining an error generated through a corresponding coding means and a corresponding decoding means based on said input signal and an output of a corresponding decoding means; and a plurality of S/N obtaining means being provided corresponding to said plurality of decoding means, and each obtaining a signal-to-noise ratio based on the power of said input signal and the power of an output of a corresponding error obtaining means;

wherein said predetermined standard includes a first requirement that a signal-to-noise ratio in the construction through a coding means and a corresponding decoding means is not to be smaller than a predetermined threshold, and a second requirement that an output of a coding means having a smallest number of output bits is to be selected as the output of the coder among the outputs of the coding means satisfying said first requirement when the power of the input signal is greater than a predetermined value; and said predetermined standard further includes of a third requirement that an error which is generated through a coding means and a corresponding decoding means is to be smaller than a predetermined maximum, and a fourth requirement that an output of a coding means having a smallest number of output bits is to be selected as the output of the coder among the outputs of the coding means satisfying said third requirement when said power of the input signal is not greater than said predetermined value.

14. A coder according to claim 12, further comprising:

a plurality of decoding means being provided corresponding to said plurality of coding means;

a plurality of error obtaining means being provided corresponding to said plurality of decoding means, and each obtaining an error which is generated through a corresponding coding means and a corresponding decoding means, based on said input signal and an output of a corresponding decoding means; and a plurality of S/N obtaining means being provided corresponding to said plurality of decoding means, and each obtaining a signal-to-noise ratio based on the power of said input signal and the power of an output of a corresponding error obtaining means;

wherein said predetermined standard includes a first requirement that a signal-to-noise ratio in the construction through a coding means and a corresponding decoding means is not to be smaller than a predetermined threshold, and a second requirement that an output of a coding means having a smallest number of output bits is to be selected as the output of the coder, among the outputs of the coding means satisfying said first requirement when the power of the input signal is greater than a first predetermined value; said predetermined standard includes a third requirement that an error which is generated through a coding means and a corresponding decoding means is to be smaller than a predetermined maximum, and a fourth requirement that an output of a coding means having a smallest number of output bits is to be selected as the output of the coder, among the outputs of the coding means satisfying said third requirement when said power of the input signal is not greater than a second predetermined value; and said predetermined standard includes a fifth requirement that said signal-to-noise ratio satisfies said first requirement and said error satisfies said second requirement, and a sixth requirement that an output of a coding means having a smallest number of output bits is to be selected as the output of the coder, among the outputs of the coding means satisfying said fifth requirement when said power of the input signal is between said first and second predetermined values.

* * * * *

UNITED STATES PATENT AND TRADEMARK OFFICE
CERTIFICATE OF CORRECTION

PATENT NO. : 5,159,611
DATED : October 27, 1992
INVENTOR(S) : Yoshihiro TOMITA et al.

It is certified that error appears in the above-indentified patent and that said Letters Patent is hereby corrected as shown below:

FRONT PAGE: [57] ABSTRACT, line 9, after "respective" insert --,--.

Col. 4, line 44, after "means" insert --,--;
line 44, change "thereof" to --of--;
line 45, change "of" to --thereof--.

Col. 5, line 45, delete "a";
line 47, change "A" to --An--.

Col. 6, line 21, change "condidate" to --candidate--;
line 24, change "condidate" to --candidate--;
line 25, change "condidate" to --candidate--;
line 34, change "condidate" to --candidate--.

Col. 7, line 11, after "error" insert --signal--.

Col. 8, line 29, change "two the" to --the two--.

Col. 9, line 24, delete ")";
line 64, in the equation, delete the space between "20" and "$\log_{10}AR$"; thus, the equation should read as follows: --$i=(SN-PG+10.8-20\log_{10}AR)/6$--;
line 65, in the equation, delete the space between "20" and "$\log_{10}AR$"; thus, the equation should read as follows: --$i=(SNI-PG+10.8-20\log_{10}AR)/6$--.

Col. 10, lines 7-8, in the equation, delete the space between "20" and "$\log_{10}AR$"; thus, the equation should read as follows: --$i=(SN-PG+10.8-20\log_{10}AR)/6$--.

Col. 11, line 45, after "necessary" insert --,--.

UNITED STATES PATENT AND TRADEMARK OFFICE
CERTIFICATE OF CORRECTION

PATENT NO. : 5,159,611
DATED : October 27, 1992
INVENTOR(S) : Yoshihiro TOMITA et al.

It is certified that error appears in the above-indentified patent and that said Letters Patent is hereby corrected as shown below:

Col. 15, line 10, change "an" to --a--.

Col. 16, line 11, in the equation, delete the space between "20" and "$\log_{10}AR$"; thus, the equation should read as follows: --$i = (S/N\text{-}PG + 10.8 - 20\log_{10}AR)/6$--;
line 12, in the equation, delete the space between "20" and "$\log_{10}AR$"; thus, the equation should read as follows: --$i = (SNI\text{-}PG + 10.8 - 20\log_{10}AR)/6$--
line 45, after "includes" delete "of".

Signed and Sealed this

Tenth Day of May, 1994

Attest:

BRUCE LEHMAN

Attesting Officer

Commissioner of Patents and Trademarks